US012752136B2

(12) United States Patent
Brandenburg et al.

(10) Patent No.: US 12,752,136 B2
(45) Date of Patent: Oct. 6, 2026

(54) FILTER UNIT WITH A FILTER BLOCK, A DAMPING LAYER AND A HOUSING, AND PROCESS OF MANUFACTURING SUCH A FILTER UNIT

(71) Applicant: Dräger Safety AG & Co. KGaA, Lübeck (DE)

(72) Inventors: Benjamin Brandenburg, Lübeck (DE); Ludwig Lorenzen, Lübeck (DE); Tim Erhardt, Lübeck (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 913 days.

(21) Appl. No.: 18/152,822

(22) Filed: Jan. 11, 2023

(65) Prior Publication Data

US 2023/0219026 A1 Jul. 13, 2023

(30) Foreign Application Priority Data

Jan. 13, 2022 (DE) ........................ 102022100690.5

(51) Int. Cl.
*A62B 23/02* (2006.01)
*B01D 46/00* (2022.01)
(Continued)

(52) U.S. Cl.
CPC .......... *A62B 23/02* (2013.01); *B01D 46/0001* (2013.01); *B01D 46/0002* (2013.01);
(Continued)

(58) Field of Classification Search
CPC ........... A62B 23/00; A62B 23/02; A62B 7/00; A62B 7/10; A62B 9/00; A62B 18/00; A62B 19/00; A62B 19/02; B01D 46/0036; B01D 46/0001; B01D 46/0002; B01D 46/24; B01D 53/02; B01D 2253/102;
(Continued)

(56) References Cited

U.S. PATENT DOCUMENTS 2,019,186 A * 10/1935 Kaiser .................. B01D 46/522
55/482
2,577,606 A * 12/1951 Conley .................. A62B 23/02
55/DIG. 35
(Continued)

FOREIGN PATENT DOCUMENTS

DE 102016009356 A1 2/2017
DE 102015012410 B4 10/2021
(Continued)

*Primary Examiner* — Colin W Stuart
(74) *Attorney, Agent, or Firm* — McGlew and Tuttle, P.C.

(57) ABSTRACT

A filter unit (100) includes a rigid filter block (1) that filters out a gas or particles from a gas mixture flowing through the filter unit (100). The filter block (1) has two end faces (Sf.a, Sf.e) and a shell surface (M). A housing including a pot (4) and a cover (2) surrounds the filter block (1). The pot (4) includes a base (4.1) and a tube (4.2). A gap (Sp) occurs between the tube (4.2) of the pot (4) and the shell surface (M) of the filter block (1). Between one end face (Sf.a) of the filter block (1) and the base (4.1) of the pot (4) there is a flat inner area (3.1) of a deformable damping layer (3). An outer area (3.2) of the damping layer (3) surrounds the inner area (3.1) in a circular ring form and is located in the gap (Sp).

20 Claims, 9 Drawing Sheets

(51) Int. Cl.
*B01D 46/24* (2006.01)
*B01D 53/02* (2006.01)

(52) U.S. Cl.
CPC ......... *B01D 46/0036* (2013.01); *B01D 46/24* (2013.01); *B01D 53/02* (2013.01); *B01D 2253/102* (2013.01); *B01D 2259/4541* (2013.01); *B01D 2265/029* (2013.01); *B01D 2271/027* (2013.01); *B01D 2275/201* (2013.01); *B01D 2275/406* (2013.01)

(58) Field of Classification Search
CPC ...... B01D 2259/4541; B01D 2265/029; B01D 2271/027; B01D 2275/201; B01D 2275/406
See application file for complete search history.

(56) References Cited

U.S. PATENT DOCUMENTS

| | | | | | |
|---|---|---|---|---|---|
| 5,038,775 | A * | 8/1991 | Maruscak | A62B 23/02 | 128/206.16 |
| 5,052,385 | A * | 10/1991 | Sundstrom | A62B 23/02 | 128/205.27 |
| 5,063,926 | A * | 11/1991 | Forsgren | A62B 23/02 | 55/DIG. 35 |
| 5,401,406 | A * | 3/1995 | Johnson | B01D 46/2407 | 210/450 |
| 9,266,663 | B1 * | 2/2016 | Lee | B26F 3/02 | |
| 9,757,678 | B2 | 9/2017 | Billingsley et al. | | |
| 2006/0283453 | A1 * | 12/2006 | Haddad | A62B 23/02 | 128/206.16 |
| 2011/0308524 | A1 * | 12/2011 | Brey | A62B 23/02 | 128/205.12 |
| 2013/0298775 | A1 * | 11/2013 | Fiet | A62B 19/00 | 96/147 |

FOREIGN PATENT DOCUMENTS

| | | | | |
|---|---|---|---|---|
| EP | 1647320 | A1 * | 4/2006 | B60K 15/035 |
| EP | 3928839 | A2 | 12/2021 | |
| FR | 1464075 | A * | 7/1966 | A62B 19/00 |
| WO | 2004067094 | A1 | 8/2004 | |
| WO | 2015069355 | A2 | 5/2015 | |
| WO | 2016075451 | A1 | 5/2016 | |
| WO | 2017021470 | A1 | 2/2017 | |

* cited by examiner

FILTER UNIT WITH A FILTER BLOCK, A DAMPING LAYER AND A HOUSING, AND PROCESS OF MANUFACTURING SUCH A FILTER UNIT

CROSS REFERENCE TO RELATED APPLICATIONS

This application claims the benefit of priority under 35 U.S.C. § 119 of German Application 10 2022 100 690.5, filed Jan. 13, 2022, the entire contents of which are incorporated herein by reference.

TECHNICAL FIELD

The invention relates to a filter unit comprising a pot, a rigid filter block in the pot and a one-piece deformable damping layer between the pot and the filter block. Furthermore, the invention relates to a process of manufacturing such a filter unit. A filter unit with a rigid filter block can be used, for example, as a part of a respirator or breathing apparatus. A user wears this respirator or breathing apparatus when in an environment where the ambient air is or may be contaminated with pollutants and/or particles. The user breathes ambient air, or ambient air is delivered to the user. The filter unit filters out the pollutants and/or particles from the inhaled or delivered ambient air, reducing the risk of harm to the user's health. Such a filter unit can also be used to filter the air in a room or fresh air supplied to an internal combustion engine.

BACKGROUND

In DE 10 2015 012 410 B4, a filter unit with a rigid filter block is described. Various possible materials from which the rigid filter block is made, as well as possible impregnations of the filter block, are described.

SUMMARY

It is an object of the invention to provide a filter unit with a rigid filter block, in which the risk of the filter block being damaged during use of the filter unit is less than in known filter units of this type. Further, the invention is directed to providing a process of manufacturing such a filter unit in which there is less risk of the rigid filter block being damaged during manufacture.

The object is achieved by a filter unit having features according to the invention and by a manufacturing process having features according to the invention. Advantageous embodiments are indicated in this disclosure. Advantageous embodiments of the manufacturing process according to the invention are also advantageous embodiments of the filter unit according to the invention, as far as useful, and vice versa.

The filter unit according to the invention comprises a cover (lid) and a pot (bowl) having a base (bottom) and a tube (a tubular side wall). The tube (tubular side wall) is in particular in the form of a cylinder or a truncated cone or truncated pyramid. The base is flat and preferably has the shape of a disk, more preferably a circular or elliptical disk. The pot and the cover together form a housing of the filter unit, preferably a rigid housing. Preferably, the cover is rigidly connected to the pot. Preferably, a flow-through opening is recessed in the cover, and a flow-through opening is also recessed in the base of the pot.

Furthermore, the filter unit according to the invention comprises a rigid filter block having two end faces and a shell surface (jacket surface, mantle surface). In particular, the filter block may have the shape of a cylinder or a truncated cone or a column having an elliptical or n-corner cross-section. The shell surface extends from one end face to the other end face. The "rigid" feature means that the filter block cannot deform reversibly at all, or at least not to any appreciable extent.

The housing with the pot and the cover surrounds this rigid filter block, preferably completely. A circumferential (peripheral) gap occurs between the tube of the pot and the shell surface of the rigid filter block. Preferably, the rigid filter block is inserted centered in the pot, i.e., a central axis of the filter block and a central axis of the pot coincide. However, it is also possible that a gap and/or an angle occurs between these two central axes, for example due to inaccuracies in manufacturing or to provide an area between the pot and the filter block for intervention by a human or manipulator.

The filter unit according to the invention further comprises a one-piece deformable damping layer. This damping layer comprises a planar inner area and a corrugated outer area. The planar inner area has the shape of a circle or an ellipse or an n-corner shape (n-gon). The corrugated outer area surrounds the flat inner area in the manner of a circular ring, preferably completely. In particular, the outer contour of the outer area has the shape of a circle or an ellipse. The outer area is circumferentially connected to the inner area. Illustratively speaking, the damping layer has the shape of a coffee filter made from paper. The planar inner area is located between the one end face of the filter block and the base of the pot. Preferably, this one end face to which the inner area is adjacent is the outflow end face. The corrugated outer area is located in the gap between the tube and the shell surface.

As just explained, the inner area of the damping layer is located between one end face of the filter block and the base of the pot. The other end face of the filter block is adjacent to the cover. This other end face is preferably the inflow end face.

The rigid filter block is configured to filter out and is capable of filtering out at least one gas and/or particles from a gas mixture flowing through the rigid filter block. Preferably, the filter unit is configured such that no appreciable quantity of the gas mixture can flow through the housing but around the rigid filter block instead of through the filter block. Rather, the gas mixture is forced onto a path guiding through the filter block. This is particularly preferably achieved by a peripheral sealing element sealing the gap between the tube of the pot and the rigid filter block. The filter block preferably absorbs or adsorbs the gas and/or particles. Preferably, the gas mixture flows at least once from the inflow side face to the outflow side face of the filter block as the gas mixture flows through the filter unit.

The filter unit according to the invention comprises a rigid filter block. In many cases, this rigid filter block exerts a lower pneumatic resistance to a gas mixture flowing therethrough than a differently configured filter block with similar filtering performance. This is particularly significant when a person uses the filter unit to inhale filtered breathing air, using only his/her own respiratory muscles to do so. In this application, the filter block reduces the breathing resistance required to suck and inhale breathing air. The relatively low pneumatic resistance is also an advantage when a delivery or conveying unit delivers the gas mixture, e.g. sucks it in.

In many possible implementations of a filter unit, a part may break off from a rigid filter block, or the rigid filter block may even break if the filter unit is subjected to mechanical impact from the outside. In particular, this undesirable damage may occur when the filter unit is dropped on the ground or is subjected to vibrations, or when a person carrying the filter unit in front of his/her face turns his/her head, causing the filter unit to strike against an object. The deformable damping layer according to the invention reduces this risk of mechanical damage. Indeed, the damping layer is capable of absorbing kinetic energy acting on the filter unit from the outside. In many cases, the corrugated outer area bridges the entire width of the gap. In many cases, unlike the rigid filter block, the damping layer can deform reversibly and thereby absorb kinetic energy.

The inner area of the deformable damping layer is located between an end face of the filter block and the base of the pot, and the outer area is located between the shell surface and the tube (tubular side wall). Therefore, in many cases, the damping layer is capable of absorbing kinetic energy due to an impulse parallel to the central axis of the filter block as well as due to an impulse perpendicular or oblique to this central axis.

In many cases, due to the corrugation the corrugated outer area is able to absorb more kinetic energy than a flat area. Nevertheless, the outer area requires only insignificantly more space in the pot than a flat area. The planar inner area is in many cases mechanically more stable and in particular more crack resistant than a corrugated area. In a direction perpendicular to the plane in which the inner area extends, the planar inner area occupies less space than if the inner area were also corrugated. The base of the pot, the planar inner area and the one end face of the filter block may be arranged parallel to each other and directly adjacent to each other, i.e. without any appreciable distance.

A gap, preferably a circumferential tubular gap, occurs between the shell surface of the filter block and the tube of the pot. Thanks to this gap, it is not necessary to manufacture the filter block and the pot in such a way that the actual dimensions of the filter block and the pot correspond exactly to respective specified target dimensions. It is further not necessary to position the filter block exactly centered in the pot. The corrugated area at least partially fills this gap and can conform to the dimensions of the filter block and the tube, and to the position of the filter block relative to the tube. The corrugated area can thus compensate to some extent for manufacturing or positioning inaccuracies.

In one embodiment, the rigid filter block comprises activated carbon that is optionally impregnated. Preferably, a plurality of channels pass through the rigid filter block, each channel connecting the two end faces with each other and wherein the channels are not connected to each other. In many cases, this embodiment results in a particularly low breathing resistance or a particularly low other pneumatic resistance as well as a good absorption effect.

As a rule, the gas mixture flows at least once from the inflow end face in a flow direction through the rigid filter block to the outflow end face, optionally several times from one end face to the other end face. The filter block extends along this flow direction. This extension is the maximum distance between the two end faces of the filter block. The corrugated outer layer has a width. If the outer layer has the shape of a circular ring, the width of the outer area is the radius of this circular ring, i.e. the difference between the radius of the corrugated outer area and the radius of the flat inner area. Preferably, the width of the outer area is smaller than the extension of the filter block along the flow direction, that is smaller than the maximum distance between the two end faces of the filter block, and smaller than the dimension of the pot along its central axis. This configuration makes it easier to manufacture the filter unit according to the invention, and to insert the damping layer into the pot during manufacture. The inserted outer portion does not protrude over the pot, nor does it protrude over the inserted filter block, and this is true even if manufacturing or positioning inaccuracies are present. According to the preferred embodiment, there is a gap between the cover and the damping layer. In many cases, this makes it easier to connect the cover to the pot in a fluid-tight manner.

According to the invention, the inner area of the damping layer is adjacent to an end face of the filter block. Preferably, this inner area of the damping layer is located between this end face of the filter block and the base of the pot. This end face is preferably the outflow end face. As a result, only a filtered gas mixture reaches the inner area and there is less risk of the inner area becoming clogged.

Preferably, a coupling unit is inserted into the base of the pot and overlaps with a flow-through opening in the base. This coupling unit is fluid-tightly connected to the base of the pot. Thanks to the coupling unit, the filter unit can be detachably connected to a filter unit carrier, for example to a face mask. For example, an external thread of the coupling unit engages an internal thread of the filter unit carrier or vice versa. It is also possible that the coupling unit comprises a bayonet catch or a snap-on catch or a snap-in catch. Because the coupling unit is inserted into the base, the filter unit is mechanically more stable than when the coupling unit is inserted into the cover. This is because the base is rigidly and fixedly connected to the tube of the pot.

The inner area of the damping layer has a maximum dimension. If the inner area is in the shape of a circle, this maximum dimension is the diameter of the circle. This maximum dimension of the inner area is preferably greater than the maximum dimension of the adjacent end face of the filter block. If both the inner area and the adjacent end face each having the shape of a circle, the diameter of the inner area is greater than the diameter of the adjacent end face. Further preferably, the maximum dimension of the inner area is at most as large as, preferably smaller than, the maximum dimension of the base of the pot. This embodiment makes it easier to place the inner area of the damping layer in the pot during manufacturing and assembling of the filter unit, such that the inner area lies flat and without wrinkles or ripples or kinks against the base. This increases the mechanical stability and in particular the crack resistance of the damping layer.

In a further implementation of this embodiment, a circumferential (peripheral) sealing element is arranged in the gap between the tube of the pot and the circumferential surface of the filter block. It is possible that the sealing element is materially connected (bonded) to the rigid filter block. Preferably, a gap occurs between this sealing element and the damping layer. Preferably, the sealing element is located between the damping layer and the cover. Preferably, a gap also occurs between the cover and the sealing element. The sealing element may also be materially connected (bonded) to the outer area of the damping layer. This sealing element further reduces the risk of unwanted movement of the filter block relative to the pot. Preferably, the sealing element is reversibly deformable and is therefore also capable of absorbing kinetic energy. Furthermore, this sealing element seals the gap to a certain extent. The sealing element reduces the risk that part of the gas mixture flowing through the filter unit bypasses the filter block.

Preferably, the filter unit additionally comprises a particle (particulate) filter which is arranged upstream of the filter block as seen in the flow direction of a gas mixture through the filter unit. Preferably, this particle filter is adjacent to that end face of the filter block which faces the cover, but may also be integrated into the cover. Because the particle filter is disposed upstream of the filter block, fewer particles, ideally no particles at all, reach the filter block and can clog the filter block. Preferably, the particle filter is corrugated or pleated to increase its surface area compared to a flat particle filter without significantly increasing the dimension of the particle filter perpendicular to the direction of flow of the gas mixture. It is also possible that the particle filter is planar or comprises a plurality of planar individual layers.

In one embodiment, the filter unit additionally comprises a further deformable damping layer, in particular a nonwoven disk (fleece disk), which is also arranged upstream of the filter block. The rigid filter block is located between the further damping layer and the inner area of the deformable damping layer. This configuration even better results in reducing a movement of the filter block w.r.t. the housing. Preferably, one end face of the filter block is adjacent to the damping layer and the opposite end face is adjacent to the further damping layer, such that the rigid filter block is located between two deformable damping layers.

The invention further relates to a breathing apparatus comprising at least one filter unit according to the invention and a filter unit carrier, optionally at least two filter units, among them at least one filter unit configured according to the invention. The filter unit carrier may be fitted to the head of a human and may comprise, for example, a face mask and a strapping (harness). The filter unit or each filter unit according to the invention is releasably connected, or can be releasably connected, to the filter unit carrier. For example, the filter unit comprises an external thread, and the filter unit carrier comprises a corresponding internal thread—or vice versa. It is also possible that the filter unit or each filter unit is connected to the filter unit carrier by means of a bayonet lock or snap lock or catch lock. Preferably, the respective bottom of the filter unit or each filter unit faces towards the filter unit carrier when the filter unit is connected to the filter unit carrier. The breathing apparatus can be a respirator (respiratory mask).

Optionally, the breathing apparatus further comprises a delivery or conveying unit, such as a blower or pump, which draws in or sucks ambient air and delivers it to the filter unit or a filter unit.

Various processes are possible to manufacture a filter unit according to the invention. A preferred manufacturing process comprises the following steps:

- A rigid pot with a base (bottom) and a tube (tubular side wall) is provided. The tube extends along a central axis. Preferably, a flow-through opening is connected to (recessed in) the base of the pot.
- A cover is provided, preferably a rigid cover. Optionally, a particle filter (particulate filter) is mounted in or on this cover. Preferably, a flow aperture is recessed in an end face of the cover.
- A rigid filter block having two end faces and a shell surface between the two end faces is provided. The rigid filter block is configured to filter out at least one gas and/or particles from a gas mixture flowing through the rigid filter block. The rigid filter block extends along a central axis. The maximum dimension of at least one end face in a plane perpendicular to the central axis of the filter block is less than the minimum diameter of the tube of the pot. If the tube and the filter block are each in the shape of a truncated cone, the diameter of the larger end face of the filter block may be larger than the minimum diameter of the tube.
- A deformable one-piece damping layer in the form of a planar object is provided. This object preferably has the form of a circular or elliptical disk. The minimum dimension of this object in that plane in which the object extends is greater than the minimum dimension of the tube in a plane perpendicular to the central axis of the tube. The deformable damping layer is configured to absorb kinetic energy.
- A circumferential sequence of corrugations is stamped into an outer area of the deformable damping layer. This makes the outer area corrugated while the inner area remains flat. The corrugated outer area surrounds the flat inner area in the manner of a circular ring. Preferably the corrugated outer area completely surrounds the flat inner area.
- The deformable damping layer is placed on top of or applied on top of the pot.
- The placed or applied deformable damping layer is moved into the interior of the pot and towards the base. This process can be compared to the process of inserting a coffee filter from the top into a receptacle of a coffee maker. The corrugated outer area is adjacent to the tube of the pot.
- In one embodiment, the damping layer is moved completely into the pot. After this movement, the flat inner area of the damping layer is adjacent to the base of the pot. In another embodiment, the damping layer is merely placed on the pot or is moved only partially into the pot, leaving a space between the planar inner portion of the damping layer and the base of the pot. As a rule, the outer portion of the damping layer still protrudes the pot. In the next process step, the damping layer is pushed completely into the pot.
- The rigid filter block is moved into the interior of the pot with one end face in front. This end face is hereinafter referred to as the front end face, and the other end face is referred to as the rear end face. The inner area of the damping layer is located between the front end face of the filter block and the base of the pot. Preferably, the direction of movement of the filter block is parallel to the central axis of the filter block. In one embodiment, the front end face of the filter block is adjacent to the inner area and pushes the deformable damping layer completely into the pot. The outer area of the damping layer is thereby rotated away from the base of the pot relative to the inner area. This process can be compared to the process of pouring coffee powder into a coffee filter and, thanks to force of gravity, pushing the coffee filter down into the receptacle. During and after this movement, the inner area of the damping layer is located between the base of the pot and the front end face.
- After the movement, the inner area of the damping layer is adjacent to the base of the pot, and the front end face of the filter block is adjacent to the inner area. During and also after the movement, the outer area of the damping layer is located in a gap that occurs between the tube of the pot and the shell surface of the filter block.
- Optionally, the gap is filled with a sealing compound which preferably cures and forms a circumferential sealing element.
- Optionally, a particle filter is placed or laid on the rear end face of the filter block. Preferably, the particle filter is placed or applied after the rigid filter block has been moved into the interior of the pot.

Optionally, a deformable further damping layer, in particular a nonwoven disk, is placed on the rear end face of the filter block. In the event of deformation, the further damping layer absorbs kinetic energy.

The cover is mechanically connected to the pot. After making this connection, the cover and the pot together form a housing, preferably a rigid housing. This housing surrounds the filter block and the damping layer, preferably completely and fluid-tightly except for an inflow side opening and an outflow side opening.

With this manufacturing process, the risk of damaging the rigid filter block during manufacture is relatively low compared to other possible manufacturing processes. In addition, it is achieved with relatively high reliability that after manufacturing the filter block, the damping layer, and the pot each have a desired position relative to each other. In many cases, the damping layer which has already fully or at least partially inserted or attached causes the filter block to be guided and centered while the filter block is moved into the pot.

According to the preferred manufacturing process, the damping layer and then the rigid filter block are placed or laid on the pot. The damping layer and the rigid filter block are moved into the pot.

It is possible that first a suitable tool pushes the damping layer completely into the pot, and then the filter block is placed on and pushed into the pot. In a preferred embodiment, however, the damping layer is placed or laid on the pot, and then the rigid filter block is placed on and pushed into the pot. As the rigid filter block is pushed into the pot, in one embodiment of the manufacturing process, it pushes the damping layer further towards the base of the pot. Therefore, it is not necessary to fully push the damping layer into the pot in advance, which in many cases would require another tool. It is sufficient to push the damping layer only partially into the pot, or even to only place it on the pot. After this step, the filter block is moved into the pot, for example pressed or pushed. The advantageous embodiment of the manufacturing process thus makes it possible to save at least one step in the manufacturing process, compared to other possible manufacturing processes. Furthermore, this process reduces the risk of a part of the filter block breaking off or even the filter block breaking during the manufacturing process.

According to preferred manufacturing processes, the damping layer is first introduced, and then the rigid filter block is moved into the pot. Preferably, the step of moving the filter block into the pot is performed as follows: The damping layer, which is already moved into the pot or at least placed on the pot, causes the rigid filter block to be centered as the filter block moves into the pot. In many cases, this embodiment eliminates the need to move or rotate the filter block at an angle to a central axis of the tube of the pot in order to center it. This embodiment further reduces the risk of the filter block being damaged during manufacture.

Preferably, the rigid pot is positioned during manufacture so that the base is at the bottom (below) and the tube is above the bottom. The damping layer and subsequently the filter block are placed vertically or obliquely from above onto the pot and are moved vertically or obliquely downwards. In this embodiment, force of gravity assists the movement of the damping layer and in particular the movement of the filter block downwards towards the base. It is even possible that only force of gravity moves the filter block into the pot.

The rigid pot, the rigid cover, the rigid filter block, and the deformable damping layer may be manufactured in at least two different locations. They are then moved to a location where the filter unit according to the invention is manufactured. This feature makes it easier to manufacture a plurality of filter units according to the invention. Preferably, one manufacturing plant each manufactures a plurality of rigid pots, of rigid covers, of rigid filter blocks and of deformable damping layers.

Optionally, after the step of moving the rigid filter block into the pot and before the step of placing the cover on the pot, a circumferential sealing element is applied into the gap between the tube and the shell surface. Preferably, a liquid or viscous sealant is applied into the gap, for example filled or injected from above, and hardens there. It is also possible that the viscous sealing compound remains permanently elastic in the gap. In one embodiment, the optional further damping layer is first placed on the filter block which has already been inserted into the pot, and then the sealing compound or sealing element is applied into the gap.

Optionally, an insulating layer and/or flame protection (fire retardant) is applied to the outside of the tube of the pot. Optionally, a handle protection is applied in front of the inflow side opening.

In the following, the invention is described with reference to exemplary embodiments. While specific embodiments of the invention have been shown and described in detail to illustrate the application of the principles of the invention, it will be understood that the invention may be embodied otherwise without departing from such principles.

DESCRIPTION OF PREFERRED EMBODIMENTS

Figure 1:
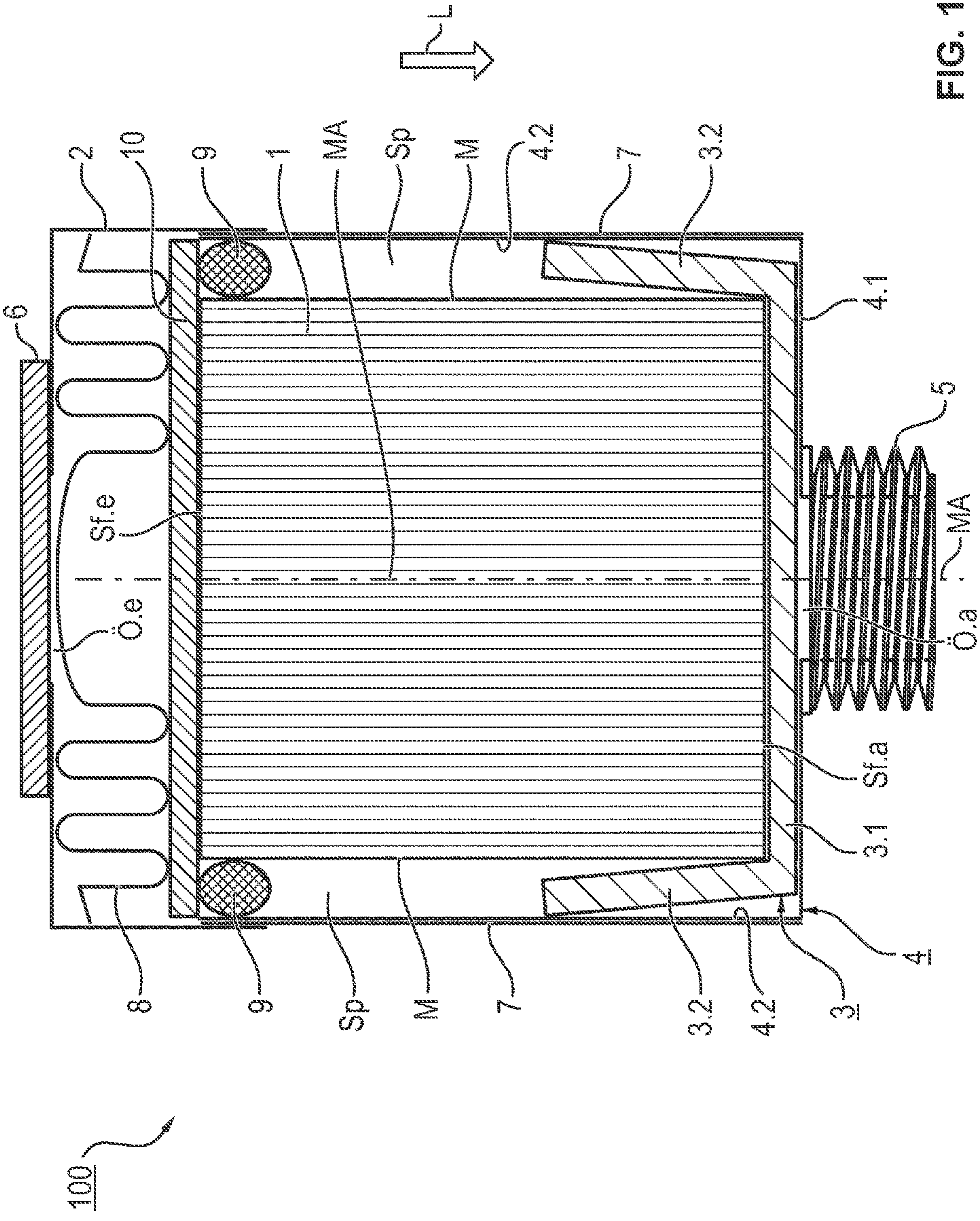
FIG. 1 is a schematic cross-sectional view through the cylindric filter unit.

Referring to the drawings, in the exemplary embodiment described below, the invention is used for a respirator (respiratory mask). The respirator comprises at least one filter unit according to the invention, as well as a face piece acting as a filter unit carrier. With the aid of this respirator, a person, for example a member of the fire brigade or the police or a miner, can be in an area contaminated with pollutants and still breathe in pollutant-free breathing air. This person is referred to below as "the user" of the respirator. The face piece of the respirator is located in front of the user's face, covers at least the user's mouth and nose, and ideally fits fluid-tight against the face. Thanks to the respirator, the user breathes filtered breathing air.

The filter unit can also be used in a breathing apparatus. This breathing apparatus comprises a face mask acting as a filter unit carrier, at least one filter unit according to the invention, and a conveying unit for gas, for example a pump (blower). This delivery unit draws in or sucks ambient air which air flows through the filter unit, or through at least one filter unit according to the invention, and delivers the air to the filter unit, or at least one filter unit. The filter unit, or at least one filter unit according to the invention filters the drawn-in breathing air, and the user then inhales this breathing air cleaned of pollutants.

The respirator and the breathing apparatus comprise the face mask, which fits against the face, and at least one filter unit, preferably at least two filter units. The face mask is made of a deformable material to adapt to the shape of the user's head and to fit fluid-tightly against the head, and comprises a strap and, for the filter unit, or each filter unit, a respective threaded socket into which a filter unit can be screwed and unscrewed. Alternatively, the filter unit, or each filter unit may be releasably connected by means of a respective bayonet fitting or latch or snap lock. The detachable connection allows the user to replace a filter unit without removing the face mask.

FIG. 1 shows, schematically in a cross-sectional view from the side, a filter unit 100 according to an implementation of the embodiment example. The representation is not necessarily true to scale.

In the example shown, the filter unit 100 is approximately in the form of a cylinder carrying a thread (coupling unit) 5 on one end face. The filter unit 100 comprises an inflow side, which is shown at the top in FIG. 1 and through which the inhaled or drawn-in breathing air flows into the filter unit 100, and an outflow side, which is shown at the bottom and through which the breathing air flows out of the filter unit 100. The thread 5 is arranged on the outflow side, and the filtered breathing air flows through the thread 5. In FIG. 1, the central axis MA of the filter unit 100 lies in the drawing plane, and the direction of flow in which air or other gas mixture flows through the filter unit 100 is shown by an arrow L pointing downwards from above.

The inhaled or drawn-in air flows into the filter unit 100 through an opening Ö.e on the inflow side, flows through the rigid filter block 1 and exits the filter unit 100 again through an opening Ö.a on the outflow side. The filter 1 filters at least one gas out of the breathing air, while this breathing air flows through the filter 1. The filter 1 of the embodiment is not necessarily able to filter particles out of the breathing air.

In the embodiment example, the filter 1 is configured as a rigid filter block. This rigid filter block 1 is made using activated carbon and may be referred to as an activated carbon honeycomb monolith. For example, the filter 1 may also be made of $Ca(OH)_2$. Preferably, the filter block 1 is impregnated with a suitable agent. The filter block 1 is traversed by a plurality of channels parallel to each other, extending parallel to the flow direction L and preferably not interconnected. This filter block 1 may be constructed as described in DE 10 2015 012 410 B4 (DE 10 2015 012 410 B4 is incorporated by reference) and, in particular, have one of the material compositions described therein. The filter unit 100 is constructed in such a way that the breathing air flowing through the filter unit 100 also flows through the filter block 1, and no relevant amount can bypass the filter block 1.

In one embodiment shown in the figures, the filter block 1 is a single rigid body in the form of a cylinder. It is also possible that the filter 1 comprises a plurality of rigid disks arranged one behind the other in a sequence, as seen in the flow direction L. This embodiment makes it easier to manufacture the filter 1 from different materials, so that the filter 1 is able to filter out different gases.

A monolithic filter block 1 of activated carbon in the form of a rigid body or a sequence of rigid disks exerts a significantly lower flow resistance and thus breathing resistance than another filter with similar filtering performance. Therefore, the use of such a monolithic filter 1 is less stressful to the user than another filter. In some cases, such a filter is lighter (lower weight) than another filter having similar filtering performance. In some cases, a monolithic filter takes up less space than another filter with similar filtering performance.

In the embodiment according to FIG. 1, the rigid filter block 1 has the form of a cylinder which extends along a central axis MA and has a shell surface (circumferential surface, mantle surface) M, a circular inflow-side end face Sf.e (top) and a circular outflow-side end face Sf.a (bottom). The central axis MA lies in the drawing plane of FIG. 1. The two end faces Sf.a, Sf.e and the plane in which the base 4.1 extends are perpendicular to the drawing plane of FIG. 1. The inflow side adjoins the inflow-side end face Sf.e of the cylinder, the outflow side adjoins the outflow-side end face Sf.a. The shell surface M extends between these two end faces Sf.e, Sf.a.

Figure 2:
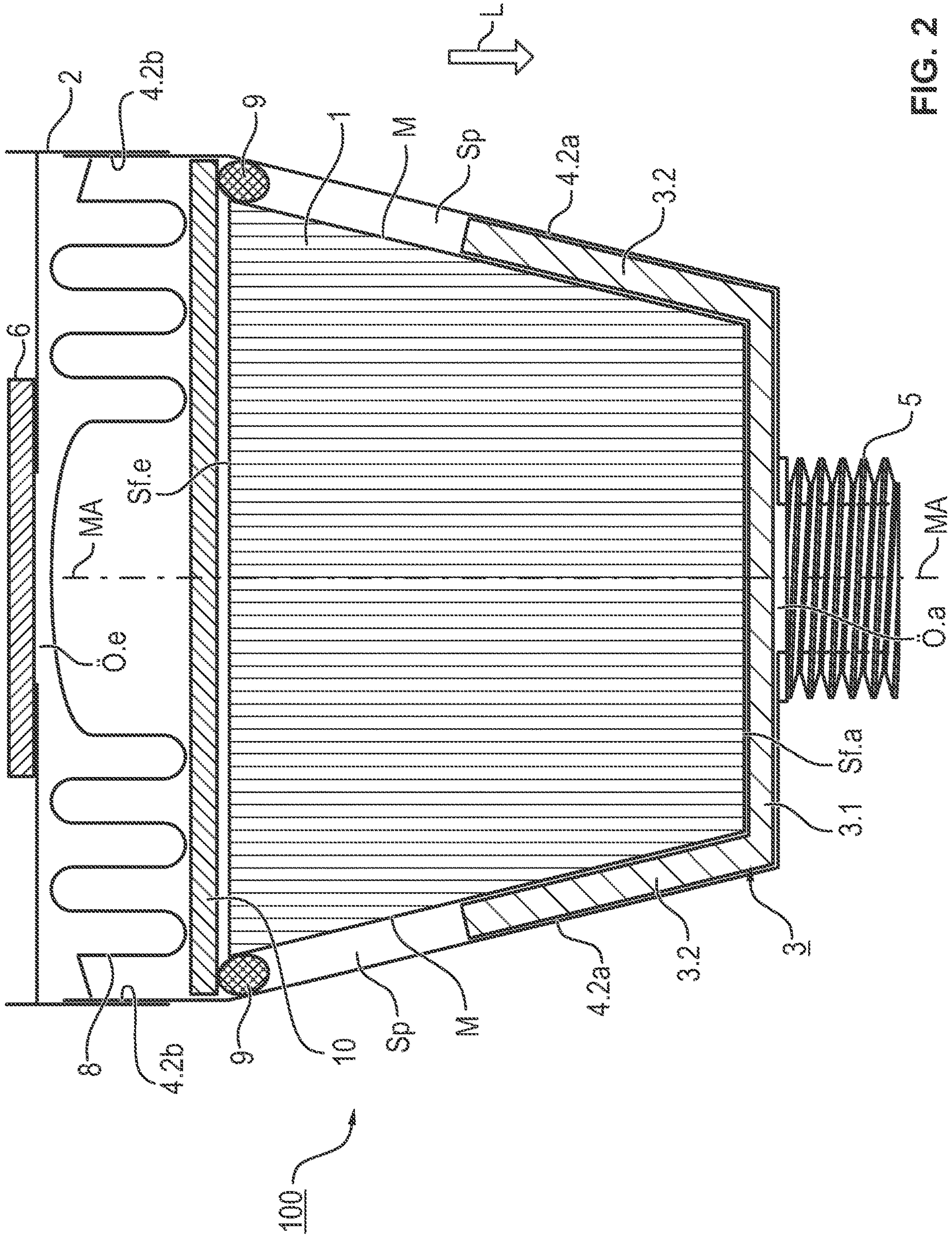
FIG. 2 is a schematic cross-sectional view through the filter unit showing a variation of the embodiment of FIG. 1, in which the pot and the filter block are each in the form of a truncated cone.

The rigid filter block 1 can also have the shape of a truncated cone, with the diameter decreasing from the inflow end face Sf.e to the outflow end face Sf.a, see FIG. 2.

A disadvantage of a filter configured as a rigid body or a sequence of rigid disks is the following: In the event of an impact, a part may break off from the filter block 1, or the filter block 1 may even break. Such an impact occurs, for example, when the filter unit 100 falls on a floor or hits a hard object during use, such as when the user turns his/her head.

In addition to the filter block 1, the filter unit 100 of the embodiment includes the following components:

a pot (bowl) 4 made of a rigid material, the pot 4 comprising a base 4.1 and a tube (a tubular side wall of cylinder or a truncated cone or truncated pyramid shape) 4.2, a cover (lid) 2 made of a rigid material, preferably of a metal or a rigid plastic, the shape of the cover 2 being adapted to the shape of the tube 4.2, an edge of the cover 2 overlapping with the tube 4.2 and being joined to the tube 4.2 by a material bond, the thread 5 on the outflow side, the thread 5 being made of a rigid material, preferably a metal or a rigid plastic, and being firmly connected to the base 4.1, a one-piece damping layer 3 made of a deformable material, described in more detail below, an optional sealing element in the form of a ring 9 made of sealing compound, foam, adhesive or another plastic, the ring 9 being located in a gap Sp between the tube 4.2 and the shell surface M of the filter block 1, preferably sealing the gap Sp and fixing the filter block 1 in the pot 4,

- an optional particle filter 8 between the inflow end face Sf.e of the filter block 1 and the cover 2, i.e. upstream of the filter block 1,
- an optional deformable nonwoven disk (fleece disk) 10 between the inflow-side end face Sf.e of the filter block 1 and the cover 2,
- an optional flame protection film guard (flame-guard, fire protection) 7 in the form of a foil, film or a layer of paint or lacquer around the tube 4.2, and
- an optional handle protection 6 in front of the inlet opening Ö.e.

The pot 4 and the cover 2 together form a rigid housing of the filter unit 100. The filter unit 100 may include both a particle filter (particulate filter) 8 and a nonwoven disk 10, or only the particle filter 8, or only the nonwoven disk 10, or neither a particle filter 8 nor a nonwoven disk 10.

The optional particle filter 8 captures particles as breathing air passes through the particle filter 8, thereby reducing the risk of particles in the breathing air reaching and clogging the filter block 1. The particle filter 8 extends in a plane perpendicular to the drawing planes of FIG. 1 and FIG. 2, and in the embodiment shown is corrugated or pleated. Preferably, the particle filter 8 is pleated, folded and/or corrugated. These embodiments significantly increase the effective surface area of the particle filter 8 without significantly increasing a dimension.

The optional nonwoven disk 10 helps to dampen any possible movement of the rigid filter block 1 in the pot 4. Such relative movement could damage the filter block 1 and/or cause annoying noise. In some applications, the nonwoven disk 10 also causes a gas flowing from the inflow side opening Ö.e through the filter unit to the outflow side opening Ö.a to be distributed in a direction perpendicular or oblique to the central axis MA to a greater extent than without a nonwoven disk 10. This distribution results in a more uniform load on the filter block 1.

The nonwoven disk 10 covers at least the inflow end face Sf.e of the filter block 1. Preferably, it protrudes the inflow end face Sf.e in all directions. Particularly preferably, the nonwoven disk 10 covers the entire opening of the pot 4 which opening is covered by the cover 2. Preferably, the sealing element 9 holds the nonwoven disk 10 in a fixed position relative to the pot 4. If the nonwoven disk 10 protrudes over the filter block 1, it is sufficient for the sealing element 9 to hold the protruding area, preferably to hold it in a material-locking manner (with a bonded connection).

If the filter unit 100 comprises both the particle filter 8 and the nonwoven disk 10, the nonwoven disk 10 is preferably located between the particle filter 8 and the filter block 1. Thanks to the particle filter 8, fewer particles reach the nonwoven disk 10.

The opening Ö.e on the inflow side is recessed centrally in the cover 2, the opening Ö.a on the outflow side is recessed centrally in the base 4.1.

In the example shown in FIG. 1, the pot 4 has the shape of a cylinder open at the top, the opening of the pot 4 being closed by the cover 2. A variation is also possible, which is shown in FIG. 2. According to this variation, the tube 4.2 has a lower part 4.2*a* in the form of a truncated cone and an upper part 4.2*b* in the form of a tube of constant cross-sectional area, the base 4.1 being connected to the lower part 4.2*a* and having a smaller diameter than the other end face of the truncated cone 4.2*a*. The two parts 4.2*a* and 4.2*b* are fixedly connected to each other. The cover 2 is placed on the upper tubular part 4.2*b* of the tube 4.2 and is fluid-tightly and materially connected thereto.

It is also possible that the ring 9 is omitted between the tube 4.2 and the filter block 1. In this alternative embodiment, the filter block 1 is floatingly supported in the housing 4, 2. The housing 4, 2 limits a possible movement of the filter block 1 along the central axis MA relative to the housing 4, 2. Also in this embodiment, the optional nonwoven disk 10 dampens a possible movement of the filter block 1.

Figure 3:
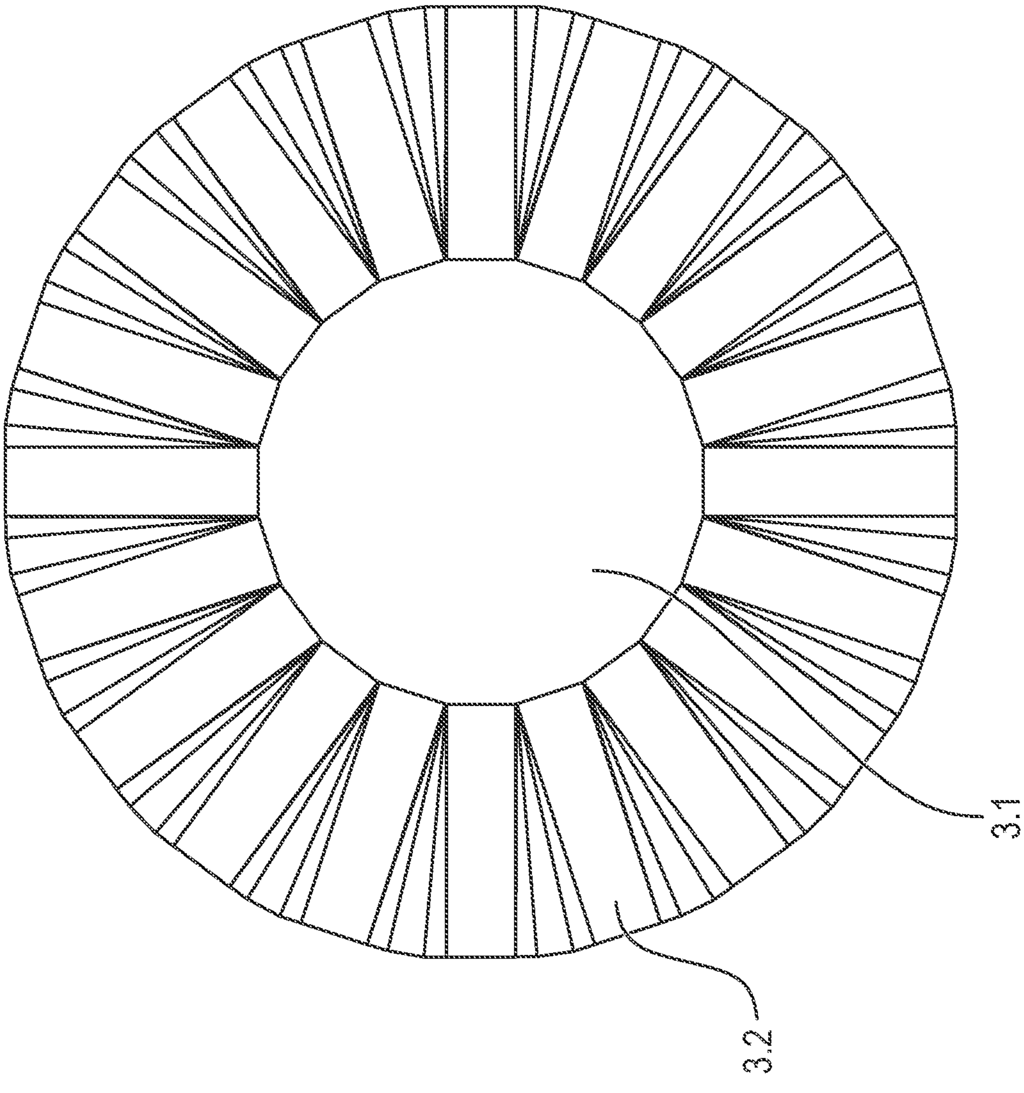
FIG. 3 is a top view of a first configuration of the damping layer before insertion into the pot.
Figure 4:
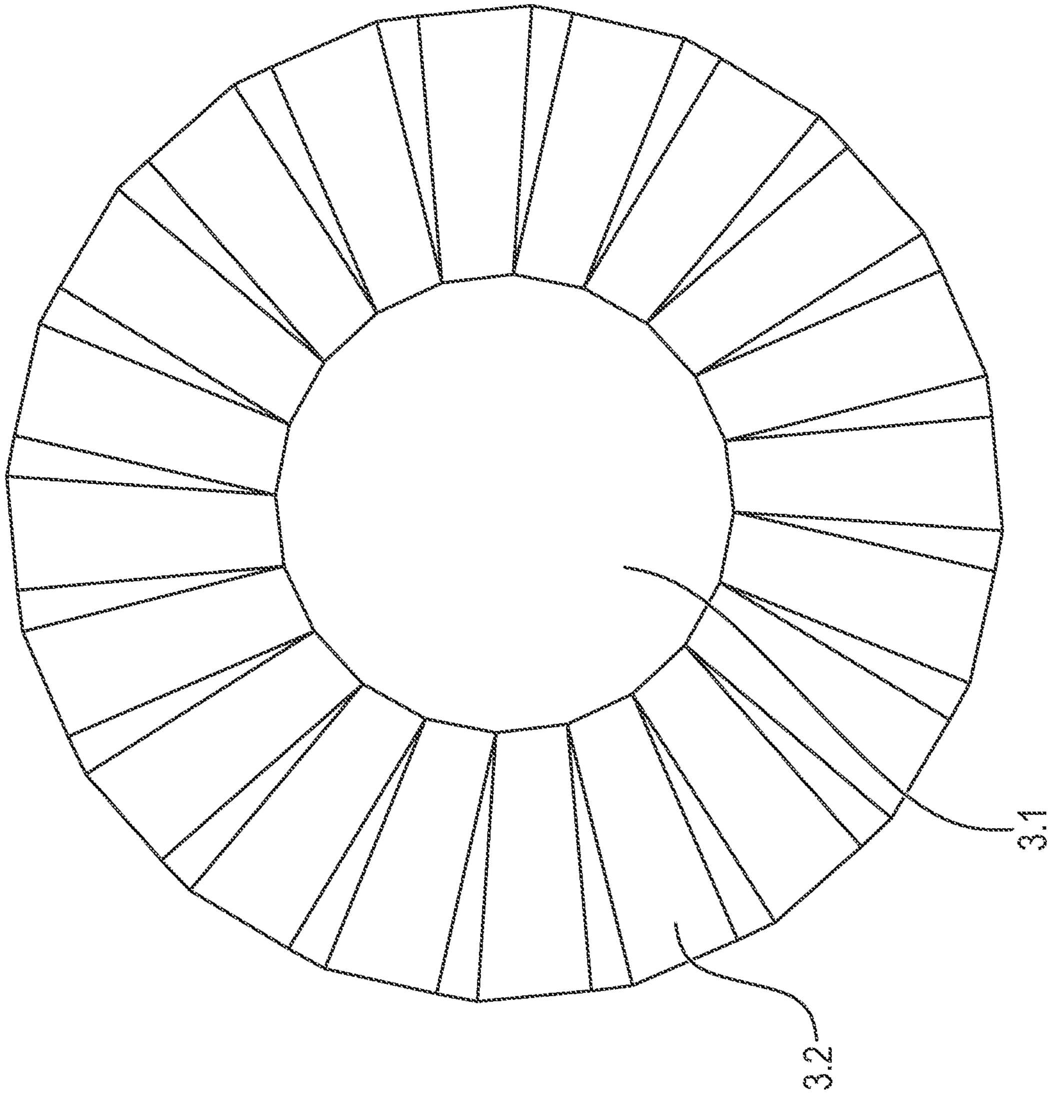
FIG. 4 is a top view of a second embodiment of the damping layer before insertion into the pot.

FIG. 3 and FIG. 4 show two possible embodiments of the deformable one-piece damping layer 3, namely in a situation before the damping layer 3 is inserted into the pot 4. In the representation of FIG. 3 and FIG. 4, the damping layer 3 extends in the drawing plane. Preferably, the damping layer 3 is capable of filtering out particles from a stream of a gas mixture flowing through the damping layer 3. The damping layer 3 may be realized in various ways, for example comprising a scrim (fabric) or a mixture of plastic or of natural fibers or paper fibers or glass fibers or polymer fibers or being made of a mixture of at least two of the aforementioned materials or of at least one other suitable material. The nonwoven disk 10 may be made of the same material as the damping layer 3. When deformed, the nonwoven disk 10 absorbs kinetic energy.

The damping layer 3 is deformable and therefore elastic to a certain degree. In both the embodiment according to FIG. 3 and the embodiment according to FIG. 4, the damping layer 3 comprises a circular inner area 3.1 and a corrugated outer area 3.2. The outer area 3.2 has the shape of a circular ring which completely surrounds the inner area 3.1 and is circumferentially connected thereto. The damping layer 3 thus has the shape of a coffee filter. Both areas 3.1, 3.2 extend in the drawing planes of FIG. 3 and FIG. 4. The outer contour of the inner area 3.1 may also have the shape of a non-circular ellipse. The outer contour of the outer area 3.1 may also be in the form of an ellipse.

The diameter of the circular base 4.1 of the pot 4 is larger than the diameter of the outflow side face Sf.a of the filter block 1. Therefore, the tubular gap Sp occurs between the tube 4.2 and the shell surface M. In the example of FIG. 2, this gap Sp tapers from the inflow side to the outflow side in the sense that the outer diameter of the gap Sp becomes smaller. The diameter of the circular inner area 3.1 of the damping layer 3 is at least as large as the diameter of the outflow side face Sf.a of the filter block 1 and smaller than the diameter of the circular base 4.1. The corrugated outer area 3.2 is located in the tubular gap Sp, cf. FIG. 1 and FIG. 2. Because of its corrugation, the outer area 3.2 can be folded upwards and thereby pushed together, and it is capable of absorbing more kinetic energy than a flat area. The outer area 3.2 therefore dampens any possible movement of the filter block 1 relative to the housing 4, 2 in a direction perpendicular or oblique to the central axis MA. Therefore, the outer area 3.2 reduces the risk of damage to the filter block 1 in the housing 4, 2.

In the embodiment shown in FIG. 1 and FIG. 2, the outer area 3.2 covers only an area of the shell surface M, namely an area adjacent to the outflow side face Sf.a. The constant width of the annular outer area 3.2, i.e. the radius of the damping layer 3 minus the radius of the annular inner area 3.1, is smaller than the extent of the filter block 1 in the flow direction L, i.e. along the central axis MA. An area is therefore left free in the gap Sp between the damping layer 3 in the pot 4 and the edge of the pot 4 facing the cover 2. This gap area which remains free may be completely or partially filled by a fixing and preferably elastic element. In the example of FIG. 1, this area in the gap Sp is partially filled by the annular sealing element 9. In the example of FIG. 2, the filter block 1 is fixed only by the damping layer 3, and a gap occurs between the annular sealing element 9 and the damping layer 3.

FIG. 5 to FIG. 9 illustrate several steps of a preferred process by which the filter unit 100 of FIG. 1 or FIG. 2 is manufactured. Identical reference signs have the same meanings.

Figure 5:
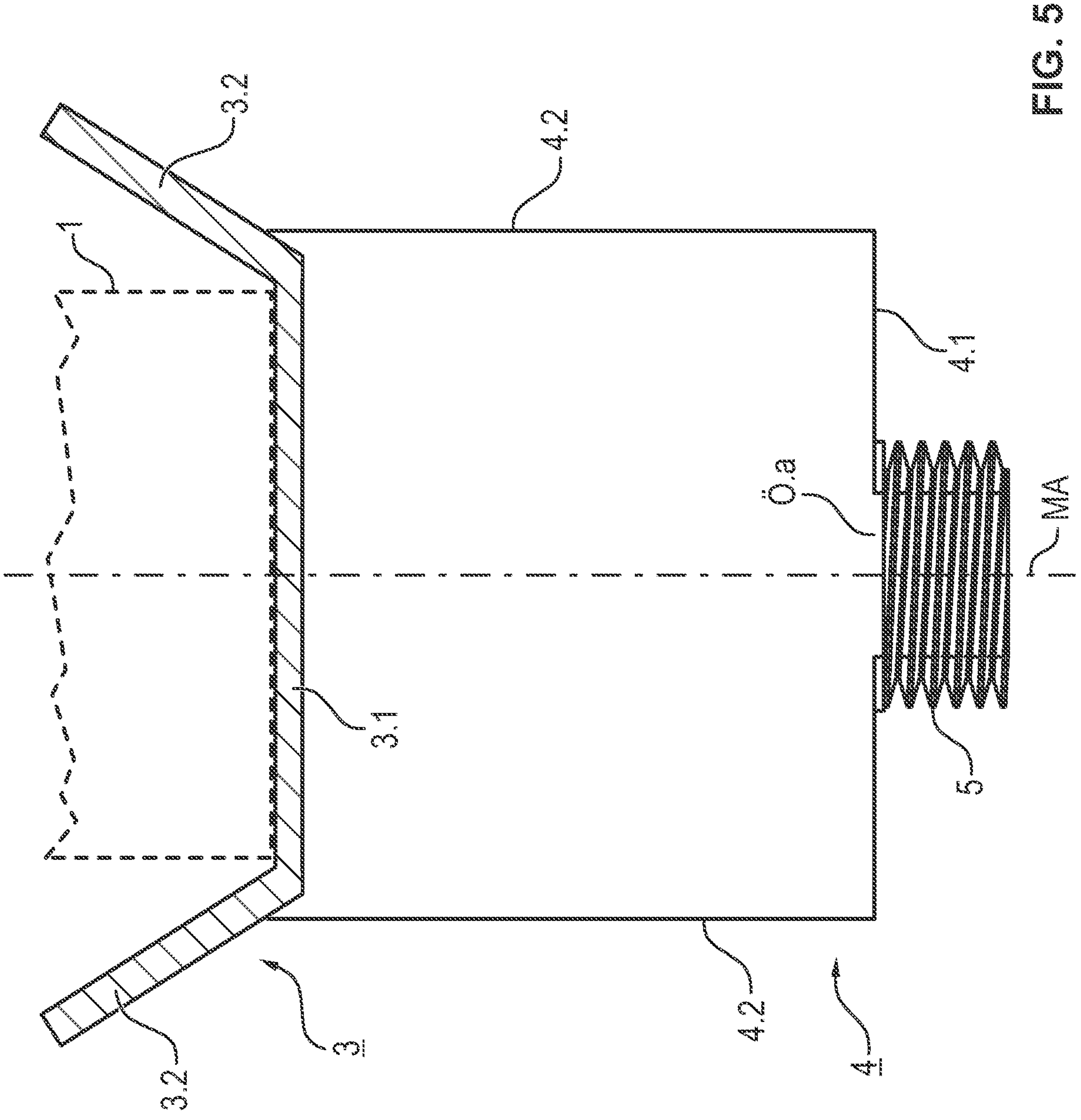
FIG. 5 is a schematic cross-sectional view showing a first step in the manufacture of the filter unit: the damping layer is placed on the tube from above.
Figure 6:
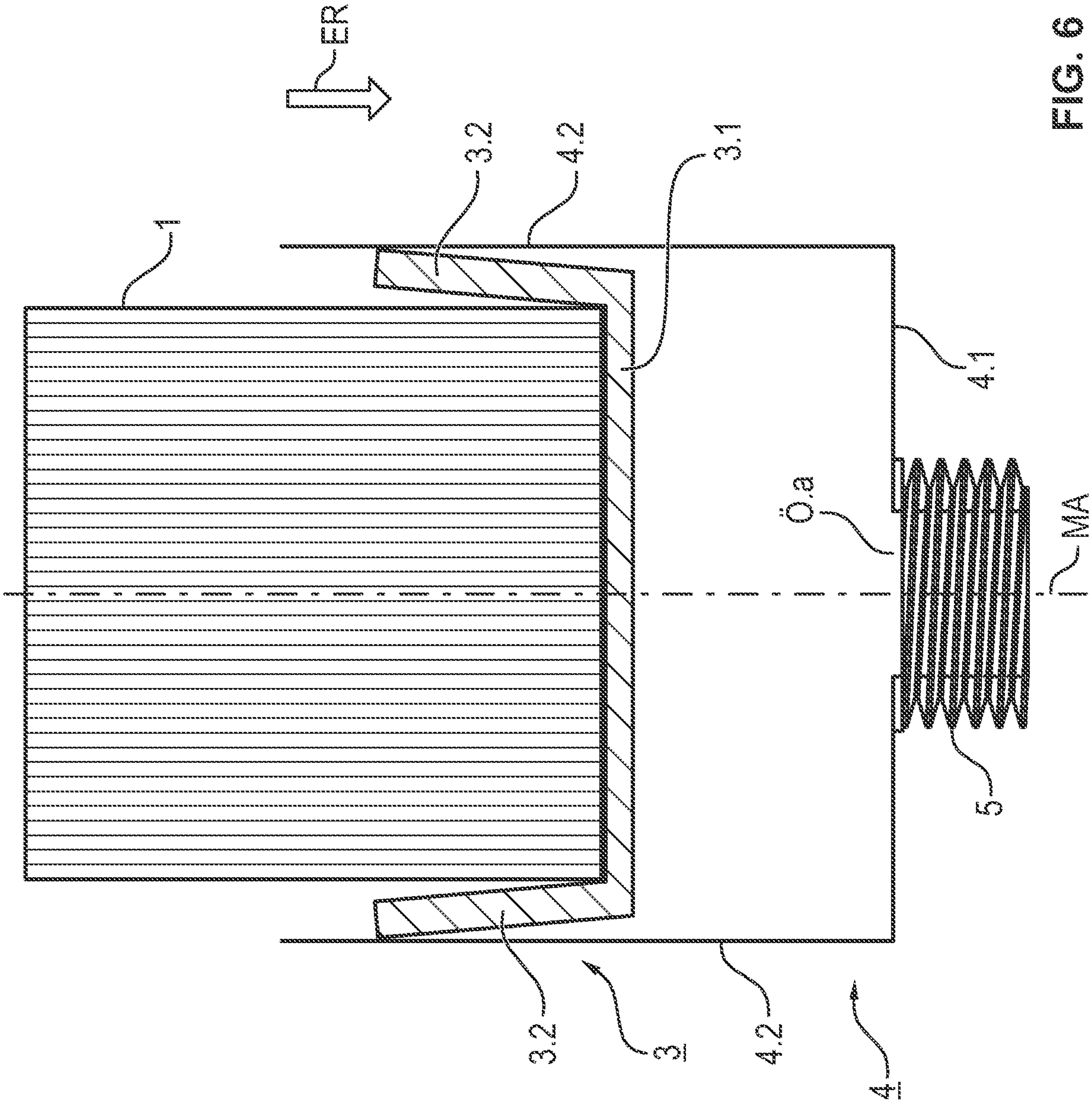
FIG. 6 is a schematic cross-sectional view showing a second step in the manufacture of the filter unit: the filter block is placed on the damping layer from above and pushed into the pot.
Figure 7:
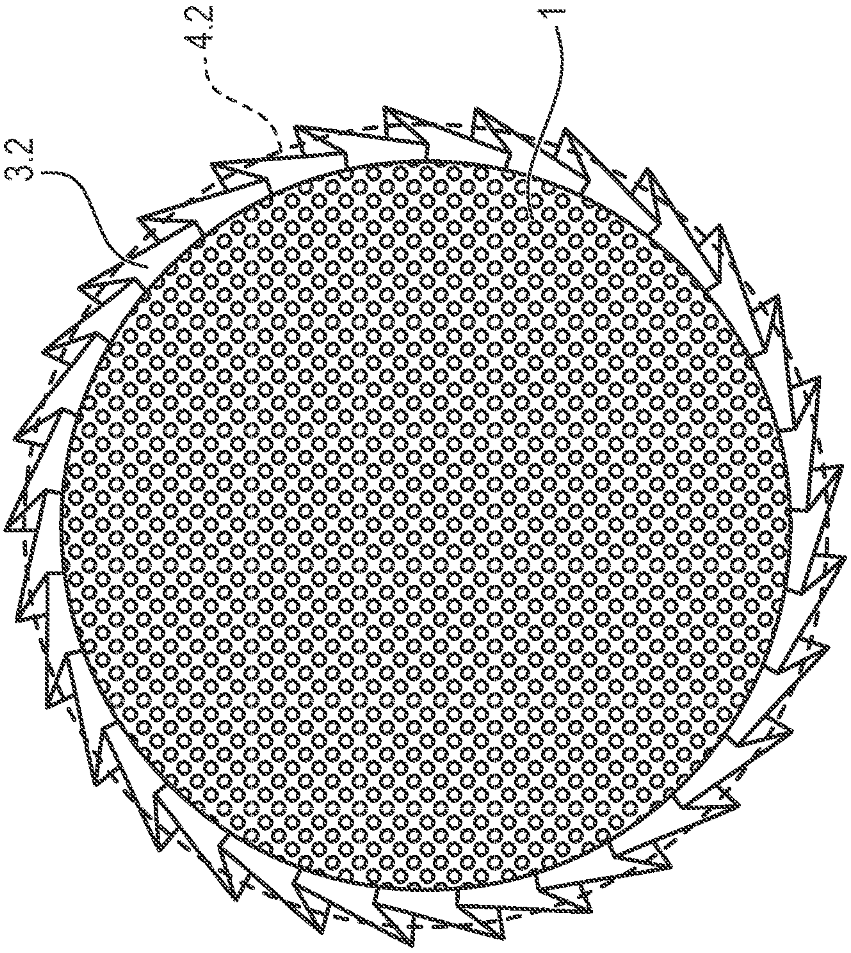
FIG. 7 is a schematic view showing the second step of FIG. 6 from above.

The viewing direction of FIG. 5, FIG. 6, FIG. 8, and FIG. 9 is the same as that of FIG. 1 and FIG. 2, whereas the central axis MA of filter block 1 and the center of base 4.1 are perpendicular to the drawing plane of FIG. 7.

The following components are prefabricated and provided at a location where the filter unit 100 is to be manufactured:

- the cover 2 with the optional handle protection 6 and the optional particle filter 8,
- the pot 4 with the base 4.1, the tube 4.2, the thread 5 on the base 4.1 and in one embodiment with the optional flame protection film 7 (not shown in FIG. 5 to FIG. 9),
- the damping layer 3 with the inner area 3.1 and the outer corrugated area 3.2, the damping layer 3 preferably extending in a plane as shown in FIG. 3 and FIG. 4, and
- the rigid filter block 1.

It is possible to manufacture these components in at least two different locations. Preferably, a sequence of similar filter units 100 according to the invention is produced, wherein for each filter unit 100 the sequence described below is carried out and the sequences for the filter units 100 are preferably carried out overlapping in time.

In a preceding step, a disk is cut out of a filter material, and a circumferential sequence of corrugations is stamped or otherwise impressed into the disk in a circular outer area 3.2, while a circular inner area remains free of corrugations. This creates a damping layer 3. This damping layer 3 then has, for example, a shape as shown in FIG. 3 or FIG. 4.

In a first step, the pot 4 is placed on a support so that the base 4.1 is supported from below. The damping layer 3 is placed on the pot 4 in the manner of a coffee filter, from the side opposite the base 4.1 and the thread 5, that is to say vertically or obliquely from above. Viewed in a direction parallel to the central axis MA of the pot 4, the inner portion 3.1 overlaps with the base 4.1. FIG. 5 illustrates this first step.

The filter block 1 is then placed on the damping layer 3 in such a way that the central axis MA of the filter block 1 coincides with the central axis of the pot 4 and one end face of the filter block 1 faces the base 4.1. This end face pointing towards the base 4.1 becomes the outflow end face Sf.a, the other end face becomes the inflow end face Sf.e.

By placing the filter block 1 on the damping layer 3, the filter block 1 is placed on the inner area 3.1 such that an end face of the filter block 1 is adjacent to the inner area 3.1. Ideally, the central axis MA of the mounted filter block 1 coincides with the central axis of the pot 4. The attached filter block 1 is indicated by a dashed line in FIG. 5.

The mounted filter block 1 is pushed linearly into the pot 4 in an insertion direction ER, cf. FIG. 6. The outflow end face of the filter block 1 is the front end face. The insertion direction ER is parallel to the center axis MA. As a result of this linear movement, the filter block 1 pushes the damping layer 3 towards and onto the base 4.1. During this movement, the outer area 3.2 is pushed upwards relative to the inner area 3.1, i.e. away from the base 4.1, and is pushed together thanks to the corrugation. This operation corresponds to the operation of pushing a coffee filter into a holder of a coffee machine. FIG. 6 and FIG. 7 show a situation during insertion from two different viewing directions. In FIG. 6 the insertion direction ER is in the drawing plane, in FIG. 7 the insertion direction ER points away from the viewer. To a certain extent, the damping layer 3 guides the filter block 1 during the process of inserting the filter block 1 into the pot 4 and centers the filter block 1 during its movement.

Figure 8:
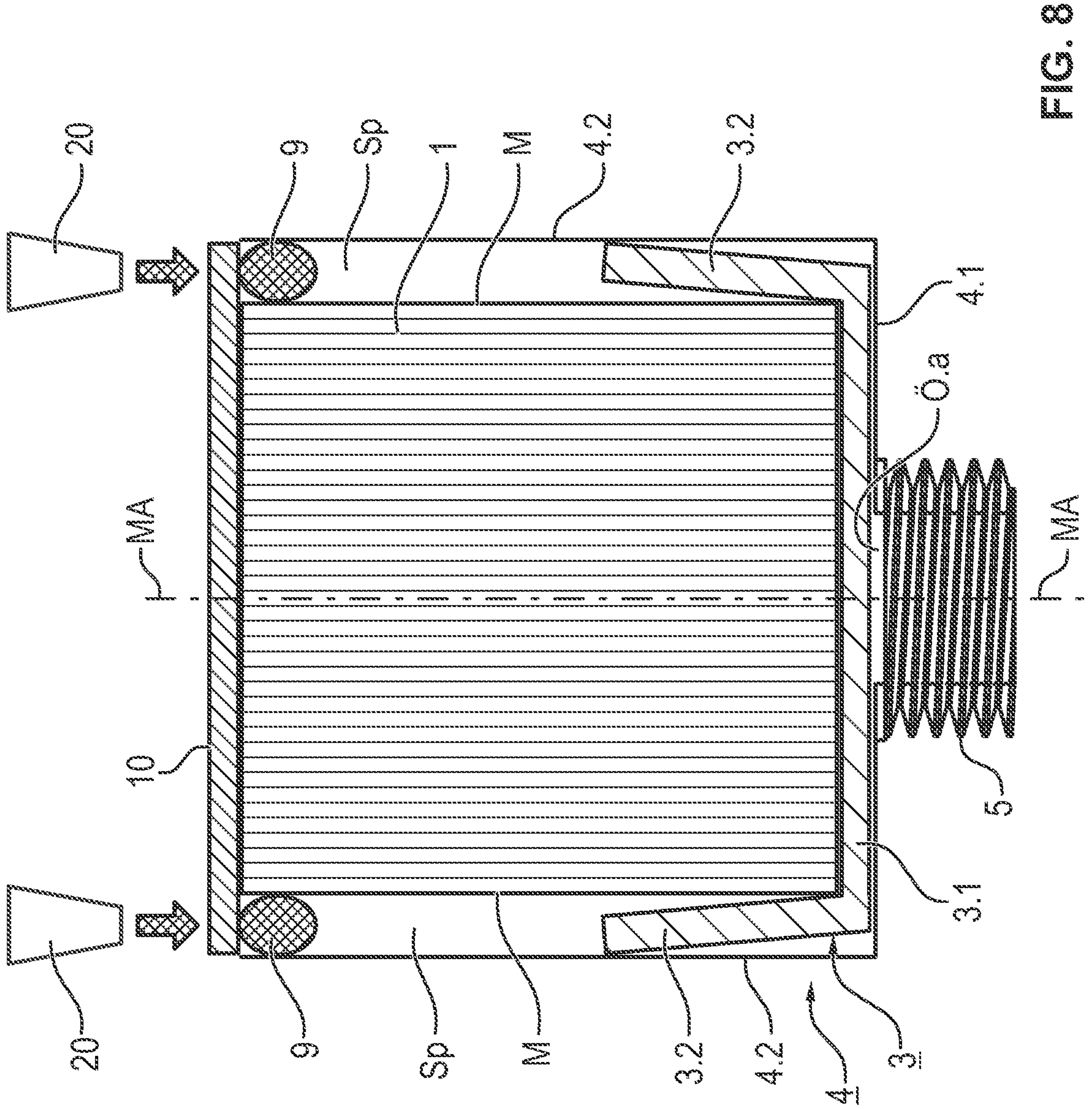
FIG. 8 is a schematic cross-sectional view showing a third step in the manufacture of the filter unit: the nonwoven disk is placed on top and the gap between the filter block and the pot is filled with a sealing compound.

After this linear movement has been completed, the inner area 3.1 of the damping layer 3 has reached the base 4.1, as shown in FIG. 8. This situation is shown in FIG. 8. In the example shown, the optional nonwoven disk 10 is then placed on the upwardly facing end face of the filter block 1. An initially liquid or at least viscous sealing compound is filled into the gap Sp. FIG. 8 shows an example of two nozzles 20 of a device which fills a liquid sealing compound into the gap Sp from above. The sealing compound flows downwards through the optional nonwoven disk 10 and penetrates the area of the nonwoven disk 10 which protrudes laterally over the filter block 1.

In one embodiment, this sealing compound hardens and becomes the annular sealing element 9 shown in FIG. 1 and FIG. 2. It is also possible to fill the entire area in the gap Sp that is not filled by the outer area 3.2 with a sealing compound. It is also possible that the sealing compound bonds to the outer area 3.2 in the gap Sp. Optionally, the sealing compound also bonds with the filter block 1.

In an alternative embodiment, the entire gap Sp or at least a part of the gap Sp is filled with an adhesive or glue, whereby this adhesive or glue preferably does not harden but remains permanently elastic. In many applications, the realization form with the adhesive is particularly capable of absorbing mechanical energy acting on the filter unit 100 from the outside.

Figure 9:
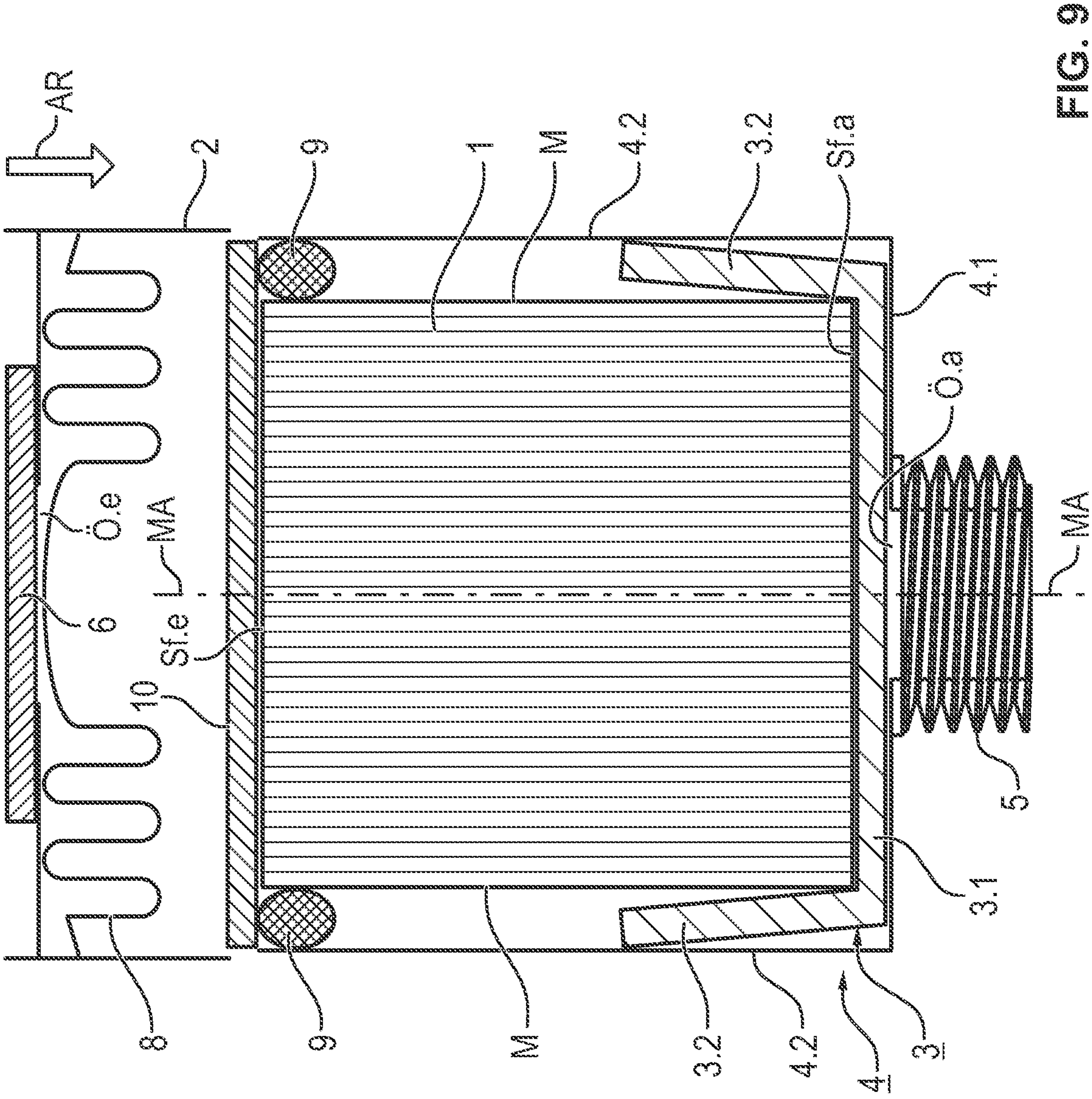
FIG. 9 is a schematic cross-sectional view showing a fourth step in the manufacture of the filter unit: the cover with the particle filter is placed from above.

Afterwards the cover 2 with the handle protection 6 and the particle filter 8 is moved towards the pot 4 in a mounting direction AR and placed on the pot 4 from above, see FIG. 9. The cover 2 is connected to the tube 4.2 in a fluid-tight manner. Optionally, the flame protection film 7 is only now glued to the outside of the rigid tube 4.2. The filter unit 100 is now completed.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1 | Rigid filter block of activated carbon (monolith), having the shape of a cylinder or truncated cone, comprising a shell surface M and two end faces Sf.e, Sf.a, extending along the central axis MA, preferably with parallel channels running through it |
| 2 | Rigid cover (lid) of the filter unit 100, placed on the tube 4.2, fluid-tightly connected to the pot 4, has the opening Ö.e on the inflow side, in one embodiment accommodates the optional particle filter 8 |
| 3 | Deformable damping layer, comprising the circular segment 3.1 and the annular segment 3.2, inserted in the pot 4 |
| 3.1 | Circular segment of the damping layer 3, is located after insertion between the base 4.1 and the outflow end face Sf.a |
| 3.2 | Annular segment of the damping layer 3, is located after insertion between the tube 4.2 and the shell surface M |
| 4 | Rigid pot (bowl) of the filter unit 100, includes the tube 4.2 and the base 4.1, surrounds the filter block 1 |
| 4.1 | Circular base of the pot 4, firmly connected to the thread 5, has the outlet side opening Ö.a |

-continued

| | |
|---|---|
| 4.2 | Tube of the pot 4, fixedly connected to the base 4.1, surrounding the shell surface M, having in one embodiment the shape of a cylindrical tube and comprising in another embodiment the parts 4.2a and 4.2b |
| 4.2a | Lower part of the tube 4.2, has the shape of a truncated cone, firmly connected to the base 4.1 |
| 4.2b | Tubular upper part of tube 4.2, surrounded by the cover 2 |
| 5 | Rigid thread, fixed to the base 4.1, overlapping with the outlet opening Ö.a, acting as a coupling unit with a filter unit carrier |
| 6 | Optional handle protection in front of the inlet opening Ö.e, connected to the cover 2 |
| 7 | Optional flame protection film, glued on the outside of the rigid tube 4.2 |
| 8 | Optional corrugated or pleated paper particle filter behind the inlet opening Ö.e, located between the inlet face Sf.e and the cover 2 or integrated in the cover 2 |
| 9 | Optional sealing element made of a sealing compound between the tube 4.2 and the shell surface M of the filter block 1, has the shape of a ring |
| 10 | Optional nonwoven disk between the particle filter 8 and the rigid filter block 1 |
| 20 | Nozzles of a device which fills the liquid sealing compound 9 into the gap Sp between the tube 4.2 and the shell surface M |
| AR | Direction in which the cover 2 is moved towards the pot 4 and placed on the pot 4 |
| ER | Direction of insertion in which the filter block 1 is pushed into the pot 4 and preferably presses the damping layer 3 into the pot 4. |
| L | Direction in which inhaled or drawn-in breathing air flows through the filter unit 100 |
| M | Shell surface of the cylindrical filter block 1, surrounded by the tube 4.2 |
| MA | Central axis of the cylindrical filter block 1 and the pot 4 |
| Ö.a | Opening on the outlet flow side, located in the base 4.1 |
| Ö.e | Opening on the inflow side, located centrally in the cover 2, protected by the handle protection 6 |
| Sf.a | Outflow end face of the cylindrical filter block 1, is perpendicular to the central axis MA, adjoins the base 4.1, acts as the front end face during the step of placing the filter block 1 in the pot 4 |
| Sf.e | Face of the cylindrical filter block 1 on the inflow side, is perpendicular to the central axis MA, adjoins the cover 2 or the particle filter 8 or the nonwoven disk 10 |
| Sp | Tubular gap between the tube 4.2 and the shell surface M, accommodates the outer area 3.2 and optionally the ring 9 |

What is claimed is:

1. A filter unit comprising:

a rigid pot with a base and a tubular side wall;

a cover cooperating with the pot such that the pot and the cover together form a housing;

a rigid filter block with two end faces and a shell surface between the end faces, the housing surrounding the rigid filter block with a gap between the tubular side wall and the shell surface, the rigid filter block being configured to filter out at least one gas and/or particles from a gas mixture flowing through the rigid filter block; and a one-piece deformable damping layer comprising:

a flat inner area; and a corrugated outer area, wherein the inner area of the deformable damping layer is located between one end face of the rigid filter block and the base of the pot, wherein the outer area of the deformable damping layer circularly surrounds the inner area, wherein the outer area of the deformable damping layer is circumferentially connected to the inner area, wherein the outer area of the deformable damping layer is located in the gap, and wherein the other end face of the rigid filter block is adjacent to the cover.

2. The filter unit according to claim 1, wherein:

the filter unit is configured such that a gas mixture flows through the rigid filter block in a flow direction; and a width of the outer area is smaller than an extent of the rigid filter block along the flow direction.

3. The filter unit according to claim 2, further comprising a circumferential sealing element arranged in the gap with a spacing distance between the sealing element and the damping layer.

4. The filter unit according to claim 1, further comprising a coupling unit connected to the base of the pot, wherein the coupling unit is configured to detachably connect the filter unit to a filter unit carrier.

5. The filter unit according to claim 1, wherein a maximum dimension of the inner area of the damping layer is larger than a maximum dimension of the adjacent end face of the rigid filter block and the maximum dimension of the inner area of the damping layer is not more than a maximum dimension of the base of the pot.

6. The filter unit according to claim 1, further comprising a particle filter spaced apart from the damping layer, wherein:

the particle filter is arranged between the cover and that end face of the rigid filter block which is adjacent to the cover, or the particle filter is integrated in the cover.

7. The filter unit according to claim 1, further comprising a further deformable damping layer integrated in the cover or arranged between the cover and that end face of the rigid filter block being adjacent to the cover;

wherein a distance between the further damping layer and the damping layer occurs; and wherein the rigid filter block is arranged between the inner area of the damping layer and the further damping layer.

8. The filter unit according to claim 1, wherein the tubular side wall comprises an inner tubular side wall portion, the inner tubular side wall portion extending parallel to a longitudinal axis of the rigid filter block, the corrugated outer area of the damping layer being in contact with the inner tubular side wall portion.

9. A breathing apparatus comprising:

a filter unit comprising: a rigid pot with a base and a tubular side wall; a cover cooperating with the pot such that the pot and the cover together form a housing; a rigid filter block with two end faces and a shell surface between the end faces, the housing surrounding the rigid filter block with a gap between the tubular side wall and the shell surface, the rigid filter block being configured to filter out at least one gas and/or particles from a gas mixture flowing through the rigid filter block; and a one-piece deformable damping layer comprising: a flat inner area; and a corrugated outer area, wherein the inner area of the deformable damping layer is located between one end face of the rigid filter block and the base of the pot, wherein the outer area of the deformable damping layer circularly surrounds the inner area, wherein the outer area of the deformable damping layer is circumferentially connected to the inner area, wherein the outer area of the deformable damping layer is located in the gap, and wherein the other end face of the rigid filter block is adjacent to the cover; and a filter unit carrier configured to rest against a head of a human, wherein the filter unit is releasably connected or connectable to the filter unit carrier.

10. The breathing apparatus according to claim 9, wherein:

the filter unit is configured to cause a gas mixture to flow through the rigid filter block in a flow direction; and a width of the outer area of the deformable damping layer is smaller than an extent of the rigid filter block along the flow direction.

11. The breathing apparatus according to claim 10, wherein the filter unit further comprises a circumferential sealing element arranged in the gap with a spacing distance between the sealing element and the deformable damping layer.

12. The breathing apparatus according to claim 9, wherein the filter unit further comprises a coupling unit connected to the base of the pot, wherein the coupling unit is configured to detachably connect the filter unit to the filter unit carrier.

13. The breathing apparatus according to claim 9, wherein a maximum dimension of the inner area of the damping layer is larger than a maximum dimension of the adjacent end face of the rigid filter block and the maximum dimension of the inner area of the damping layer is not more than a maximum dimension of the base of the pot.

14. The breathing apparatus according to claim 9, wherein the filter unit further comprises a particle filter; wherein:

the particle filter is arranged between the cover and that end face of the rigid filter block which is adjacent to the cover, or the particle filter is integrated in the cover; and wherein a distance between the particle filter and the damping layer occurs.

15. The breathing apparatus according to claim 9, wherein the filter unit further comprises a further deformable damping layer integrated in the cover or arranged between the cover and that end face of the rigid filter block which is adjacent to the cover;

wherein a distance between the further damping layer and the damping layer occurs; and wherein the rigid filter block is arranged between the inner area of the damping layer and the further damping layer.

16. The breathing apparatus according to claim 9, wherein the tubular side wall comprises an inner tubular side wall portion, the inner tubular side wall portion extending parallel to a longitudinal axis of the rigid filter block, the corrugated outer area of the damping layer being in contact with the inner tubular side wall portion.

17. A process of manufacturing a filter unit, the process comprising the steps of:

providing a rigid pot with a base and a tubular side wall;

providing a cover;

providing a rigid filter block with two end faces and a shell surface, the rigid filter block being configured to filter out at least one gas and/or particles from a gas mixture flowing through the rigid filter block;

providing a deformable one-piece damping layer in a form of a flat object;

stamping a corrugation into an outer area of the deformable damping layer to produce a corrugated outer area of the damping layer which circularly surrounds an inner area of the damping layer;

placing the deformable damping layer on the pot and subsequently moving the deformable damping layer into an interior of the pot such that the inner area of the damping layer is moved towards the base of the pot and the corrugated outer area of the damping layer is adjacent to the tubular side wall of the pot;

moving the rigid filter block into the interior of the pot such that the inner area of the damping layer is located between the base of the pot and an end face of the rigid filter block, and the corrugated outer area of the damping layer is located in a gap between the tubular side wall of the pot and the shell surface of the rigid filter block; and connecting the cover to the pot such that the cover and the pot together form a housing which surrounds the rigid filter block and the damping layer.

18. The process according to claim 17, wherein the step of moving the rigid filter block inside the pot causes the deformable damping layer to move into the interior of the pot.

19. The process of claim 17, wherein the step of moving the rigid filter block inside the pot is carried out such that the rigid filter block is guided by the deformable damping layer into a centered position relative to the pot.

20. The process of claim 17, wherein the tubular side wall comprises an inner tubular side wall portion, the inner tubular side wall portion extending parallel to a longitudinal axis of the rigid filter block, the corrugated outer area of the damping layer being in contact with the inner tubular side wall portion.

* * * * *